(12) United States Patent
Yoo et al.

(10) Patent No.: US 7,598,296 B2
(45) Date of Patent: Oct. 6, 2009

(54) PREPARATION METHOD OF POLYAMIDE THIN FILM COMPOSITE REVERSE OSMOSIS MEMBRANE AND POLYAMIDE THIN FILM COMPOSITE REVERSE OSMOSIS MEMBRANE PREPARED THEREFROM

(75) Inventors: Je-Kang Yoo, Seoul (KR); Sun-Yong Lee, Seoul (KR); Youn-Kook Kim, Seoul (KR)

(73) Assignee: Woongjincoway Co., Ltd., Kongju-si (KR)

( * ) Notice: Subject to any disclaimer, the term of this patent is extended or adjusted under 35 U.S.C. 154(b) by 478 days.

(21) Appl. No.: 10/586,520

(22) PCT Filed: Dec. 26, 2005

(86) PCT No.: PCT/KR2005/004546

§ 371 (c)(1),
(2), (4) Date: Jul. 19, 2006

(87) PCT Pub. No.: WO2007/035019

PCT Pub. Date: Mar. 29, 2007

(65) Prior Publication Data

US 2008/0234462 A1    Sep. 25, 2008

(30) Foreign Application Priority Data

Sep. 20, 2005   (KR) .................... 10-2005-0087305

(51) Int. Cl.
*C08J 5/20*   (2006.01)
(52) U.S. Cl. ................. 521/27; 521/25; 210/500.37
(58) Field of Classification Search ................. None
See application file for complete search history.

(56) References Cited

U.S. PATENT DOCUMENTS

| | | | |
|---|---|---|---|
| 4,606,943 A | 8/1986 | Rak et al. | |
| 4,783,346 A | 11/1988 | Sundet | |
| 5,368,889 A | 11/1994 | Johnson et al. | |
| 5,658,460 A | 8/1997 | Cadotte et al. | |
| 5,755,964 A * | 5/1998 | Mickols | 210/500.37 |

* cited by examiner

Primary Examiner—David Wu
Assistant Examiner—Vu Nguyen
(74) Attorney, Agent, or Firm—Birch, Stewart, Kolasch & Birch, LLP

(57) ABSTRACT

A preparation method of a polyamide thin film composite reverse osmosis membrane and a polyamide thin film composite reverse osmosis membrane prepared using the preparation method are provided. The preparation method of a polyamide thin film composite reverse osmosis membrane using interfacial polymerization of an amine aqueous solution and amine-reactive compound includes the steps of (a) forming an active layer through interfacial polymerization by contacting a surface of a porous support with an amine aqueous solution containing a polyfunctional aromatic amine monomer and an organic solution containing polyfunctional acyl halide monomer as an amine-reactive compound, and (b) performing post-treatment preceded by the forming of the active layer by contacting the active layer with an aqueous solution containing 0.1 to 100 wt % of polyfunctional tertiary alcohol amine. The polyamide thin film composite reverse osmosis membrane prepared by using the polyfunctional tertiary alcohol amine as a post-treatment compound has improved water permeability and salt rejection compared to a case of using various post-treatment agents or methods.

9 Claims, No Drawings

PREPARATION METHOD OF POLYAMIDE THIN FILM COMPOSITE REVERSE OSMOSIS MEMBRANE AND POLYAMIDE THIN FILM COMPOSITE REVERSE OSMOSIS MEMBRANE PREPARED THEREFROM

TECHNICAL FIELD

The present invention relates to a preparation method of a polyamide thin film composite (TFC) reverse osmosis membrane and a polyamide TFC reverse osmosis membrane prepared using the preparation method, and more particularly, to a preparation method of a polyamide TFC reverse osmosis membrane having improved water permeability and salt rejection by using polyfunctional tertiary alcohol amine as a post-treatment agent compared to the prior art using various post-treatment agents or methods.

BACKGROUND ART

Water and air are indispensable to survival of any form of life on the earth, including human kind, and their availability and quality exert a great influence on the sustenance of the earth as well as humans. With the advance of scientific and industrial development, the applicability of water resources is becoming more and more abundant and water resources are becoming increasingly important. Under the circumstances, acquisition of high-quality water resources is of great concern for the sustenance of lives in many areas around the world. Although the world face scarcity and contamination of water resources and there is a continuously growing need for water supply, available water resources are not readily accessible. According to United Nation's surveys, there are over 120 million people, about one fifth of the global population, have great difficulty in accessing to safe drinking water, and the number of people facing scarcity of sewage treatment facilities has doubled, that is, about 240 million people are drinking poor quality drinking water. Today there are over 300 million people around the world die everyday because of unsanitary drinking water, which results from poorly managed water resources.

Reportedly, over 70% of available water in the world is seawater. However, since sea water contains a great deal of impurities such as salinity, various kinds of salt solids, or the like, it cannot be directly used as potable water for industrial, agricultural or home use. Accordingly, in order to allow people to avail themselves of sea water or saline water in a wide variety of areas in their daily lives, desalination is essentially performed to remove various salts from the sea water or saline water. A TFC reverse osmosis membrane is essentially used in desalination.

A general thin film composite (TFC) reverse osmosis membrane comprises a porous polymer support that offers a mechanical strength and a thin active layer formed on the porous polymer support. In particular, a polyamide active layer is formed at an interface between polyfunctional amine aqueous solution and polyfunctional acyl halide organic solution. An exemplary polyamide TFC reverse osmosis membrane is described in U.S. Pat. No. 4,277,344, which was issued to Cadotte in 1981. According to this patent, an aromatic polyamide active layer is formed through an interfacial polymerization reaction occurring between polyfunctional aromatic amine monomer having at least two primary amine groups polyfunctional acyl halide monomer having at least three acyl halide groups. In the described technology, interfacial polymerization is carried out such that a polysulfone support is immersed into an 1,3-phenylenediamine (MPD) aqueous solution, excess 1,3-phenylenediamine (MPD) aqueous solution on a surface of the support is removed and the resultant product is coated with a trimesoyl chloride (TMC) dissolved in "FREON" TF (trichlorotrifluoroethane) solvent. Here, a contact time for the interfacial polymerization is 10 seconds. After completing the interfacial polymerization, the resulting TFC reverse osmosis membrane is dried at room temperature. The TFC reverse osmosis membrane prepared by the Cadotte method exhibited relatively good flux and good salt rejection performance. Various approaches have been taken thereafter to further improve the flux and salt rejection performance of polyamide TFC reverse osmosis membranes.

For example, in U.S. Pat. No. 4,872,984, which was issued to Tomaschke in 1989, there is disclosed a polyamide TFC reverse osmosis membrane formed by interfacial polymerization performed such that an aqueous solution containing polyfunctional aromatic amine monomer having at least two reactive amine groups and a amine salt compound prepared by monomeric tertiary amine and strong acid is contacted with an organic solution containing aromatic polyfunctional acyl halide compound on a porous support. Here, the amine salt compound contained in the aqueous solution is a monomeric amine, which consists of a tertiary amine salt formed by a tertiary amine and a strong acid or a quaternary amine salt. Among the amines used herein, examples of the useful monomeric tertiary amines include a trialkylamine, such as trimethylamine, triethylamine, tripropylamine; an N-alkylcycloaliphatic amine, such as 1-methylpiperidine; an N,N-dialkylamine, such as N,N-dimethylethylamine and N,N-diethylmethylamine; an N,N-dialkyl ethanolamine, such as N,N-dimethylethanolamine; and so on. Examples of the quaternary amine salts include a tetraalkylammonium hydroxide, such as, tetramethylammonium hydroxide, tetraethylammonium hydroxide, and tetrapropylammonium hydroxide; a benzyltrialkylammonium hydroxide, such as benzyltrimethylammonium hydroxide, benzyltriethylammonium hydroxide, and benzyltripropylammonium hydroxide; and mixtures thereof.

In U.S. Pat. No. 5,576,057, issued to Hirose in 1996, there is described a TFC reverse osmosis membrane having improved flux by adding 10~50 wt % alcohol to an amine aqueous solution. Here, preferred examples of the alcohol used include ethanol, propanol, botanol, butyl alcohol, 1-pentanol, 2-pentanol, isobutyl alcohol, isopropyl alcohol, 2-ethylbotanol, 2-ethylhexanol, octanol, cyclohexanol, tetrahydrofurfuryl alcohol, neopentyl glycol, t-botanol, benzyl alcohol, 4-methyl-2-pentanol, 3-methyl-2-butanol, pentyl alcohol, allyl alcohol, ethylene glycol, diethylene glycol, triethylene glycol, tetraethylene glycol, propanediol, butanediol, pentanediol, hexanediol, glycerol, or a combination thereof. However, when alcohol is added to a first amine solution to prepare the TFC reverse osmosis membrane, a solubility difference between the solubility parameter of the first amine solution and the solubility parameter of a second organic solution should be from 7 to 15 $(cal/cm^3)^{1/2}$. If the solubility difference between the solubility parameter of the first amine solution and the solubility parameter of the second organic solution is greater than 15 $(cal/cm)^{1/2}$, the polyamide active layer is formed well at the interface between the two solutions by interfacial polymerization but the water permeability is decreased.

The thus-formed polyamide TFC reverse osmosis membrane exhibited 29~42 $[L/m^2 \ hr]$ in water permeability and 99.4~99.5% in salt rejection. That is to say, the polyamide TFC reverse osmosis membrane had improved water permeability compared to a conventional polyamide reverse osmosis membrane prepared without alcohol added, the conventional polyamide reverse osmosis membrane having 25 [L/m²hr] of water permeability and 99.6% of salt rejection. In this case, when a small amount of alcohol is used, the alcohol adding effect is negligible. On the other hand, when excess alcohol is used, an interfacial polymerization reaction may not be properly carried out due to a similar solubility parameter between the solubility parameter of the amine aqueous solution and the solubility parameter of an organic solution of acyl halide. Thus, the thus-formed polyamide TFC reverse osmosis membrane has an undesirably reduced salt rejection.

In U.S. Pat. No. 4,950,404, issued to Chau et al., there is proposed a method for forming a polyamide TFC reverse osmosis membrane by interfacial polymerization method, in which to a polar aprotic solvent is added to an amine aqueous solution and is made to be in contact with an organic solution containing polyfunctional acyl halide on a surface of a porous support. Here, preferred examples of the polar aprotic solvent used include N-methylpyrrolidone, 2-pyrrolidone, N,N-dimethylformamide, dioxane, pyridine, lutidine, picoline, tetrahydrofuran, sulforan, sulforene, hexamethylphosphoamide, triethylphosphite, N,N-dimethyacetqamide, N,N-dimethypropionamide, and the like.

Chau, et al. proposed a polyamide TFC reverse osmosis membrane, as disclosed in U.S. Pat. No. 4,983,291. The polyamide TFC reverse osmosis membrane was prepared through post-treatment performed by contacting an polyamide active layer prepared by interfacial polymerization on a porous support with a solution containing an acid such as ascorbic acid, hydrochloric acid, citric acid, sulfamic acid, tartaric acid, ethylenediaminetetraacetic acid, p-toluenesulfonic acid, L-lysine hydrochloride, or glycine, followed by drying the resultant product at a given temperature (ranging from room temperature to 170° C.) for a period of time (1 min~120 min). However, as a composition ratio of the aprotic solvent increases to attain high water permeability, the prepared polyamide TFC reverse osmosis membrane exhibited a reduced degree of salt rejection of the reverse osmosis membrane. In a case where the prepared TFC reverse osmosis membrane was allowed to contact with an acid-containing solution and dried at about 100° C., if the acid was added in a small amount, an effect of enhancing the performance of the membrane was negligible. Conversely, if an excessive amount of acid was added, the salt rejection of the membrane was reduced while enhancing the water permeability of the membrane. In a case where the polyamide TFC reverse osmosis membrane was contacted with an acid-containing solution and dried at relatively high temperature of about 170° C., its water permeability was reduced.

Ja-Young Koo, et al. proposed a polyamide TFC reverse osmosis membrane, as disclosed In U.S. Pat. No. 6,245,234, issued to in 2001. In the disclosed patent, in order to improve the water permeability of the polyamide TFC reverse osmosis membrane, a polyfunctional tertiary amine and a strong acid were added to an amine aqueous solution, forming a polyfunctional tertiary amine salt, the polyfunctional tertiary amine comprising a hydrocarbon alkane backbone having at least two tertiary amine groups. In addition, in order to improve water permeability of the polyamide TFC reverse osmosis membrane, a polar solvent is further added. The polyfunctional tertiary amine added to the aqueous amine solution is preferably selected from the group consisting of N,N,N',N'-tetramethyl-1,6hexanediamine, N,N,N',N'-tetramethyl-1,4-buthanediamine, N,N,N',N'-tetramethyl-2-butene-1,4-diamine, N,N,N',N'-tetramethyl-1,3-buthanediamine, N,N,N',N'-tetramethyl-1,3-propanediamine, N,N,N', N'-tetramethyl-1,8-octanediamine, N,N,N',N'-tetramethyl-1,7-heptanediamine, N,N,N',N'-tetramethyl-1,5-pentanediamine, N,N,N',N'-tetraethyl-1,4-buthanediamine, N,N,N',N'-tetraethyl-1,3-buthanediamine, N,N,N',N'-tetraethyl-1,3-propanediamine, 1,4-dimethylpiperazine, N,N,N', N'-tetraethylethylenediamine. Here, the polyfunctional tertiary amine and the strong acid are reacted together in a molar ratio that is greater than 1:0, respectively, and is less than 1:n, respectively. In addition, preferred examples of the polar solvent include 2-methoxyethanol, 2-ethoxyethanol, 2-propoxyethanol, 2-butoxyethanol, t-butylmethyl ether, 1,3-heptanediol, 2-ethyl-1,3-hexanediol, dimethyl sulfoxide, tetramethyl sulfoxide, butyl sulfoxide, and methylphenyl sulfoxide.

In U.S. Pat. No. 6,368,507, issued to Koo, et al. in 2002, there is proposed a polyamide TFC reverse osmosis membrane prepared by a reaction of an amine aqueous solution and an organic solution, the amine aqueous solution comprising a salt compound containing a polyfunctional amine, a polar solvent, a tertiary amine salt, and a tertiary amine, and the organic solution comprising a polyfunctional acyl halide, a polyfunctional sulfonyl halide or a polyfunctional isocyanate, wherein a molar ratio of the polyfunctional amine to a strong acid is greater than or equal to 1:1, respectively, and is less than 1:n, respectively, n being the number of amine groups in the polyfunctional tertiary amine.

In U.S. Pat. No. 5,755,964, issued to Mickols et al. in 1998, there is disclosed a polyamide TFC reverse osmosis membrane. In the disclosed patent, to improve the water permeability of the reverse osmosis membrane, a polyamide active layer is treated with ammonia or a particular alkyl amine. That is, the disclosed patent proposed a method of increasing the flux of a TFC reverse osmosis membrane or a polyamide nanofiltration (NF) membrane. Usable examples of the amine proposed by the disclosed invention include ammonia substituted with one to three alkyl groups of one to two carbons which alkyl groups may be further substituted with one or more substitutents selected from hydroxy, phenyl, or amino; butylamine; cyclohexylamine; 1,6-hexanediamine and mixtures thereof. In addition, preferred substituted ammonia substances include dimethylamine; trimethylamine; ethylamine; triethanolamine; N,N-dimethyl ethanolamine; ethylenediamine; and benzylamine. The patent proposed by Mickols et al. is directed to a method of preparing a nanofiltration membrane or a reverse osmosis membrane including preparing a polyamide TFC reverse osmosis membrane by an interfacial polymerization reaction such that a porous support surface is contacted with an amine aqueous solution containing polyfunctional aromatic amine monomer and an organic solution containing polyfunctional acyl halide monomer, contacting a polyamide active layer with the amine aqueous solution selected from the group consisting of an amine from the group consisting of ammonia; ammonia substituted with one to three alkyl groups of one to two carbons which alkyl groups may be further substituted with one or more substitutents selected from hydroxy, phenyl, or amino; butylamine; cyclohexylamine; 1,6-hexanediamine and mixtures thereof. Here, the concentration of the amine aqueous solution is in the range of about 5 to about 50 wt %. In addition, the proposed method consists essentially of contacting the discriminating layer with the amine having a pH level in the range of about 7 to about 12 at a temperature of 0 to 130° C. for 15 seconds to 5 days. Further, according to the method proposed by Mickols et al., the polyamide active layer is further dried at a temperature of from about 60 to about 80° C. after contact with the amine. The thus prepared composite membrane may be a reverse osmosis membrane or a nanofiltration membrane.

DISCLOSURE OF INVENTION

Technical Problem

The above-described methods of increasing the water permeability of the conventional polyamide TFC reverse osmosis membranes are largely classified into two types as follows. First, an additive such as an amine salt or alcohol is added to a first reaction chamber. Specifically, a tertiary monomeric amine salt obtained from adding tertiary monomeric amine and a strong acid, or a quaternary monomeric amine salt, is added to an amine aqueous solution. Alternatively, a polyfunctional tertiary amine salt obtained from polyfunctional tertiary amine and a strong acid, and a polar solvent, are added to an amine aqueous solution, the polyfunctional tertiary amine salt consisting of an alkane having from 2 to 10 carbon atoms as at least two tertiary amine side chains. Further, a polar aprotic solvent, alcohol, and the like, are added to an amine aqueous solution. Second, the prepared polyamide TFC reverse osmosis membrane is subjected to post-treatment. Specifically, an active layer of the prepared polyamide TFC reverse osmosis membrane is contacted with an amine aqueous solution which optionally may contain one or more alkyl groups having one or two carbon atoms substituted with one or more substituents selected from the group consisting of hydroxyl, phenyl and amino groups.

However, neither of the above-described two methods could enhance both the water permeability and salt rejection to desired extents. Particularly, there has been substantially no teaching or suggestion in the prior art disclosing methods of simultaneously enhancing the water permeability and salt rejection through post-treatment after reverse osmosis membrane formation. Among the above-referenced method, the polyamide TFC reverse osmosis membrane prepared by a method disclosed in U.S. Pat. No. 5,755,964, issued to Mickols et al. demonstrated a relatively low salt rejection while having enhanced water permeability. Thus, the Mickols membrane cannot be suitably used as a TFC reverse osmosis membrane. The method disclosed in the patent of Mickols et al., however, may be regarded as an efficient method of preparing a nanofiltration membrane capable of effectively removing organic substance having a molecular weight of 200 or greater by converting a polyamide TFC reverse osmosis membrane into a nanofiltration membrane without having to changing a conventional reactive-amine monomer. However, the Mickols membrane still has relatively low salt rejection performance compared to performance of the polyamide TFC reverse osmosis membrane.

Technical Solution

To solve the above problems, it is an objective of the present invention to provide a preparation method of a polyamide TFC reverse osmosis membrane having improved water permeability and a high NaCl rejection of greater than 95% by performing post-treatment, compared to the prior art in which various types of post-treatment compounds or methods are employed, the post-treatment being performed by (1) contacting a polyamide active layer with polyfunctional tertiary alcohol amine having at least two tertiary amines having substituted alcohol groups on hydrocarbon side chains, and/or drying the resultant product.

It is another objective of the present invention to provide a polyamide TFC reverse osmosis membrane prepared by the preparation method.

To accomplish the above object of the present invention, there is provided a preparation method of a polyamide TFC reverse osmosis membrane using interfacial polymerization of an amine aqueous solution and amine-reactive compound, the preparation method comprising the steps of: (a) forming an polyamide active layer through interfacial polymerization by contacting a surface of a porous support with an amine aqueous solution containing a polyfunctional aromatic amine monomer and an organic solution containing polyfunctional acyl halide monomer as an amine-reactive compound; and (b) performing post-treatment preceded by the forming of the polyamide active layer by contacting the polyamide active layer with an aqueous solution containing 0.1 to 100 wt % of polyfunctional tertiary alcohol amine.

According to another aspect of the present invention, there is provided a high performance polyamide TFC reverses osmosis membrane prepared by the above-state preparation method.

Advantageous Effects

In the polyamide TFC reverse osmosis membrane according to the present invention, polyfunctional tertiary alcohol amine is used as a post-treatment compound and a high-temperature drying step is further performed after performing the post-treatment, thereby attaining the polyamide TFC reverse osmosis membrane having improved water permeability and salt rejection compared to the prior art using various post treatment agents or methods.

BEST MODE FOR CARRYING OUT THE INVENTION

Hereinafter, the present invention will be described in greater detail.

The inventors of the present invention discovered that it was possible to prepare a polyamide TFC reverse osmosis membrane having improved water permeability and salt rejection by further employing polyfunctional tertiary alcohol amine as a post-treatment compound in known methods of preparing polyamide TFC reverse osmosis membrane, compared to the prior art in which various kinds of post-treatment compounds or various post-treatment methods are employed. The inventors completed the present invention based on the finding that the water permeability and salt rejection of the reverse osmosis membrane were considerably enhanced by drying the polyamide TFC reverse osmosis membrane that has been post-treated in the above-described manner, the drying being performed at room temperature to about 150° C. for about 10 seconds to about 1 hour.

In addition to preparing the polyamide thin film composite reverse osmosis membrane as a product of interfacial polymerization of a known amine aqueous solution and an amine-reactive compound, the preparation method of the polyamide TFC reverse osmosis membrane according to the present invention comprises the steps of (a) forming an polyamide active layer through interfacial polymerization by contacting a surface of a porous support with an amine aqueous solution containing a polyfunctional aromatic amine monomer and an organic solution containing polyfunctional acyl halide monomer as an amine-reactive compound; and (b) performing post-treatment preceded by the forming of the polyamide active layer by contacting the polyamide active layer with an aqueous solution containing 0.1 to 100 wt % of polyfunctional tertiary alcohol amine.

Preferably, the polyfunctional aromatic amine monomer is 1,4phenylenediamine, 1,3-phenylenediamine, 2,5-diaminotoluene, diphenyl diamine, 4-methoxy-m-phenylenediamine, or a mixture thereof.

In addition, the amine-reactive compound forming the polyamide active layer by interfacial polymerization with the amine aqueous solution containing the polyfunctional aromatic amine monomer is preferably a polyfunctional acyl halide such as trimesoyl chloride (TMC), terephthaloyl chloride (TPC), isophthaloyl chloride (IPC), or a mixture thereof. Hexane, cyclohexane, heptane, alkanes having from 8 to 12 carbon atoms, halogenated hydrocarbons, such as the FREON series, or a combination thereof, is preferably used as the organic solvent for the amine-reactive compound. Particularly, ISOPAR series are preferably used.

Preferred examples of the polyfunctional tertiary alcohol amine used as the post-treatment compound include N,N,N',N'-tetrakis(2-hydroxyl propyl)ethylenediamine, N,N,N',N'-tetrakis(2-hydroxylethyl)ethylenediamine, N,N,N',N'',N'''-pentakis(2-hydroxypropyl)diethylenetriamine, 2,2',2'',2'''-ethylenedinitrilotetraethanol, a combination of these compounds.

The polyfunctional tertiary alcohol amine proposed in the present invention preferably has a structure comprising at least two tertiary amine groups having substituted alcohol group on hydrocarbon side chains, and is preferably represented by the formulas 1 and 2. As represented by the formulas 1 and 2, the polyfunctional tertiary alcohol amine of the present invention includes at least two tertiary amines on hydrocarbon alkane side chains, in which at least one alcohol group is present on the hydrocarbon side chain of the tertiary amine. Alternatively, the polyfunctional tertiary alcohol amine of the present invention may have at least one tertiary amine on the hydrocarbon side chain of the tertiary amine, as represented by Formula 2, in which at least one alcohol group is present on the hydrocarbon side chain of the tertiary amine or substituted tertiary amine. In Formula 1 and 2, R substituted on the hydrocarbon side chains forming the polyfunctional tertiary alcohol amine represents an alcohol group.

In other words, in order to allow the effect of adding alcohol as a post-treatment compound to be properly exerted to increase both the water permeability and the salt rejection of the polyamide TFC reverse osmosis membrane as the final product, the alcohol groups in the polyfunctional tertiary alcohol amine structure are preferably position on the side chains.

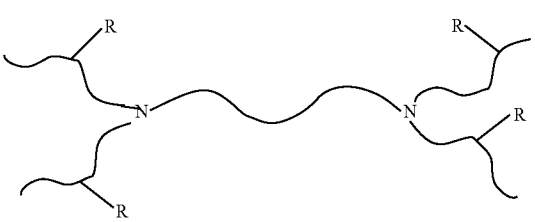

[Formula 1]

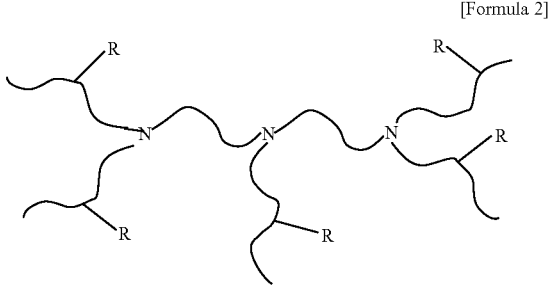

[Formula 2]

When polyfunctional tertiary alcohol amines having the above structures are used as post-treatment compounds, it can be expected that alcohol groups existing in the polyfunctional tertiary alcohol amines noticeably enhance the water permeability and salt rejection of polyamide TFC reverse osmosis membranes. In a case where an amine such as triethanol amine is used as a post-treatment compound, as the number of alcohol groups substituted at terminals of tertiary amine side chains, the salt rejection of the reverse osmosis membrane may be undesirably lowered while the water permeability of the reverse osmosis membrane increases. According to the present invention, however, there exist at least two tertiary amines, that is, the number of substituted alcohol groups is larger than in the prior art in which only one alcohol group exists at the terminal of a tertiary amine side chain, so that the water permeability of the inventive membrane is noticeably improved. In addition, when the post-treatment is followed by a high-temperature drying step, a reduction of the salt rejection, which is caused by addition of polyfunctional tertiary alcohol amine, can be minimized.

The post-treatment is conducted by contacting an polyamide active layer of the polyamide TFC reverse osmosis membrane formed by interfacial polymerization with an aqueous solution containing 0.1 to 100 wt % of polyfunctional tertiary alcohol amine after forming the polyamide active layer. That is, when a concentration of polyfunctional tertiary alcohol amine is 100 wt %, post-treatment is carried out through use of only polyfunctional tertiary alcohol amine. The concentration of polyfunctional tertiary alcohol amine contained in the aqueous solution of the polyfunctional tertiary alcohol amine is more preferably in a range of 1 to 50 wt %. When the polyamide TFC reverse osmosis membrane is prepared by contacting the polyamide active layer with an aqueous solution of high-concentration polyfunctional tertiary alcohol amine, the membrane demonstrated high water permeability but a reduced salt rejection.

Although the above-described post-treatment can enhance both the water permeability and salt rejection of the polyamide TFC reverse osmosis membrane, the water permeability and salt rejection of the polyamide TFC reverse osmosis membrane may further be enhanced by performing a drying step further to the post-treatment.

To prepare a polyamide TFC reverse osmosis membrane, the drying step is generally performed at room temperature. In a case of further performing the drying step according to the present invention, the drying step is performed at room temperature to about 150° C. for about 10 seconds to about 1 hour. If the drying temperature is lower than room temperature, the effect that is exerted by adding polyfunctional tertiary alcohol amine as a post-treatment compound may not be achieved, that is, the polyamide TFC reverse osmosis membrane may have high water permeability while the salt rejection of the polyamide TFC reverse osmosis membrane is disadvantageously reduced. If the drying temperature is greater than 150° C., the polyamide TFC reverse osmosis membrane may shrink, resulting in a considerably reduction of the water permeability. If the drying time is shorter than 10 seconds, the polyfunctional tertiary alcohol amine aqueous solution on the surface of the polyamide TFC reverse osmosis membrane may not be sufficiently dried so that a film performance enhancing effect is negligible. If the drying time exceeds 1 hour, the polyamide TFC reverse osmosis membrane may shrink, resulting in a reduction of water permeability of the polyamide TFC reverse osmosis membrane. Thus, when post-treatment with polyfunctional tertiary alcohol amine is performed and a drying step is further performed in order to prepare a polyamide TFC reverse osmosis membrane having high water permeability and excellent salt rejection efficiency, the drying step is more preferably performed under drying conditions stated above.

As described above, in the polyamide TFC reverse osmosis membrane according to the present invention, polyfunctional tertiary alcohol amine is used as a post-treatment agent and a high-temperature drying step is further performed after performing the post-treatment, thereby attaining the polyamide TFC reverse osmosis membrane having improved water permeability and salt rejection compared to the prior art using various post-treatment agents or methods.

MODE FOR THE INVENTION

Preferred Examples of the present invention and Comparative Examples will now be described. The following Examples and Comparative Examples are provided for illustrative purposes only and are in no way intended to limit the scope of the present invention.

1. Preparation of Polyamide TFC Reverse Osmosis Membrane

EXAMPLE 1

A nonwoven fabric was coated with a polysulfone solution and a porous polysulfone support layer prepared by a phase inversion method. The porous polysulfone support was immersed in a primary amine aqueous solution containing 2.0 wt % of 1,3-phenylenediamine (MPD) for 1 minute. Then, an excess amine aqueous solution on the polysulfone support surface was removed using a rubber roller. The resultant product was immersed in an Isopar organic solution having 0.1 wt % of trimesoyl chloride (TMC) dissolved therein for 10 seconds, and dried at room temperature, thereby preparing a polyamide TFC reverse osmosis membrane. Then, the polyamide TFC reverse osmosis membrane was subjected to post-treatment. During the post-treatment, the prepared polyamide TFC reverse osmosis membrane was immersed in an aqueous solution containing 10 wt % of N,N,N',N'-tetrakis(2-hydroxylpropyl)ethylenediamine (TKHPEA) for 10 minutes and dried at an oven maintained at a temperature of about 95° C. for 5 minutes.

COMPARATIVE EXAMPLE 1

A polyamide TFC reverse osmosis membrane was prepared by immersing a polysulfone support in an amine aqueous solution containing 2.0 wt % of MPD, removing excess amine aqueous solution from a surface of the polysulfone support, and performing an interfacial polymerization on a surface of the resultant product using a "FREON" TF (trichlorotrifluoroethane) solvent having 0.1 wt % of TMC dissolved therein for 10 seconds.

EXAMPLES 2-5

Polyamide TFC reverse osmosis membranes were prepared by the same method as in Example 1 except that concentrations of TKHPEA used as a post-treatment agent varied in a range of 20~100 wt %. Table 1 shows concentrations of TKHPEA used in Examples 2 through 5.

TABLE 1

| Example No. | TKHPEA (wt %) |
| --- | --- |
| Example 2 | 20 |
| Example 3 | 30 |
| Example 4 | 50 |
| Example 5 | 100 |

EXAMPLES 6-16

Polyamide TFC reverse osmosis membranes prepared by the same method as in Example 1 were further dried under various conditions listed in Table 2. Table 2 shows various conditions for drying steps in Examples 6 through 16.

TABLE 2

| Example No. | Drying temperature (° C.) | Drying time (min) |
| --- | --- | --- |
| Example 6 | 25 | 3 |
| Example 7 | 85 | 3 |
| Example 8 | 90 | 3 |
| Example 9 | 95 | 3 |
| Example 10 | 100 | 3 |
| Example 11 | 105 | 3 |
| Example 12 | 110 | 3 |
| Example 13 | 115 | 1 |
| Example 14 | 120 | 3 |
| Example 15 | 125 | 7 |
| Example 16 | 130 | 10 |

EXAMPLES 17-18

Polyamide TFC reverse osmosis membranes were prepared by the same method as in Example 3 using polyfunctional tertiary alcohol amine listed in Table 3 as a post-treatment agent instead of TKHPEA.

TABLE 3

| Example No. | Alcohol amine |
| --- | --- |
| Example 17 | TKHEEA |
| Example 18 | PKHPDETA |

* In Table 3, "TKHEEA" stands for N,N,N',N'-tetrakis(2-hydroxyethyl)ethylenediamine, and "PKHPDETA" stands for N,N,N',N'',N'''-pentakis(2-hydroxypropyl)diethylenetriamine.

COMPARATIVE EXAMPLE 2

A polyamide TFC reverse osmosis membrane was prepared by immersing a porous polysulfone support in a amine aqueous solution containing 2.0 wt % of MPD, 2.0 wt % of tetramethylammonoum hydroxide (TMAH), and 0.1 wt % of sodium dodecyl benzyl sulfonate (SDBS) for 2 minutes, removing excess amine aqueous solution, contacting the resultant product with an Isopar solution containing having 0.05 wt % of TMC and 0.075 wt % of IPC dissolved therein, and drying at an oven maintained at a temperature of about 95° C. for 6 minutes.

COMPARATIVE EXAMPLE 3

A polyamide TFC reverse osmosis membrane was prepared by immersing a porous polysulfone support in an amine aqueous solution containing 1.6 wt % of MPD, 0.6 wt % of N,N,N'N'-tetramethyl-1,6-hexanediamine (MHD), and 0.06 wt % of toluenesulfonic acid (TSA) for 40 seconds, removing excess amine aqueous solution, and performing an interfacial polymerization on a surface of the resultant product using an Isopar organic solution having 0.1 wt % of TMC dissolved therein.

COMPARATIVE EXAMPLE 4

A polyamide TFC reverse osmosis membrane was prepared by immersing a porous polysulfone support in an amine aqueous solution containing 2.0 wt % of MPD, 2.3 wt % of camphorsulfonic acid (CSA), 1.1 wt % of triethylamine (TEA), and 2.0 wt % of 2-butoxyethanol (BE) for 40 seconds, removing excess amine aqueous solution, performing an interfacial polymerization on a surface of the resultant support using an Isopar organic solution having 0.1 wt % of TMC dissolved therein, and drying the resultant product at about 90° C. for 3.5 minutes.

COMPARATIVE EXAMPLE 5

A polyamide TFC reverse osmosis membrane was prepared by immersing the prepared polyamide TFC reverse osmosis membrane (FT-30 available from FilmTec Corp.) in 100 wt % of a triethanolamine (TEA) aqueous solution and post-treated at −60° C. for 1 hour.

EXAMPLES 19-21

Polyamide TFC reverse osmosis membranes were prepared by the same methods as in Comparative Examples 2 through 4 were subjected to post-treatment such that they were immersed in an aqueous solution having 10 wt % of N,N,N',N'-tetrakis(2-hydroxylpropyl)ethylenediamine (TKHPEA) dissolved therein for 10 minutes and dried at an oven maintained at a temperature of about 95° C. for 5 minutes.

2. Measurement of Water Permeability and Salt Rejection of Polyamide TFC Reverse Osmosis Membrane Measurements of the water permeability and salt rejection were performed on the polyamide TFC reverse osmosis membranes prepared by the same methods as in Examples 1 through 20 and Comparative Examples 1 through 5. A 2,000 ppm NaCl aqueous solution was used as a feed solution and the measurements were conducted at pressure of 225 psi. Measurement results are shown below in Table 4.

TABLE 4

| Example No. | Water permeability (L/m²hr) | Salt rejection (%) |
| --- | --- | --- |
| Comparative Example 1 | 36.4 | 98.5 |
| Example 1 | 71.0 | 98.1 |
| Example 2 | 74.2 | 98.6 |
| Example 3 | 74.3 | 98.3 |
| Example 4 | 75.2 | 96.8 |
| Example 5 | 74.5 | 98.0 |
| Example 6 | 80.5 | 92.3 |
| Example 7 | 73.5 | 98.7 |
| Example 8 | 78.2 | 99.1 |
| Example 9 | 75.9 | 97.8 |
| Example 10 | 74.7 | 96.9 |
| Example 11 | 76.7 | 98.2 |
| Example 12 | 76.0 | 99.0 |
| Example 13 | 77.1 | 98.1 |
| Example 14 | 76.8 | 98.0 |
| Example 15 | 77.7 | 98.2 |
| Example 16 | 74.5 | 98.4 |
| Example 17 | 76.8 | 97.9 |
| Example 18 | 74.4 | 98.2 |
| Comparative Example 2 | 34.2 | 99.7 |
| Example 19 | 69.3 | 98.3 |
| Comparative Example 3 | 66.1 | 97.0 |
| Example 20 | 77.3 | 97.0 |
| Comparative Example 4 | 62.9 | 99.0 |
| Example 21 | 79.5 | 97.3 |
| Comparative Example 5 | 62.4 | 91.1 |

As shown in Table 4, in all the polyamide TFC reverse osmosis membranes prepared in various Examples of the present invention, amounts of water permeated exceeded 70 L/m²hr and salt rejection were very high, i.e., much higher than 90%. Thus, the polyamide TFC reverse osmosis membranes according the present invention can be advantageously used for reverse osmosis membranes satisfying film requirements including a high degree of water permeability and high salt rejection. In particular, the polyamide TFC reverse osmosis membranes prepared in Examples 1 through 18, which were post-treated with polyfunctional tertiary alcohol amine, are quire different from the polyamide TFC reverse osmosis membrane post-treated with triethanol amine described in Comparative Example 8 and dried at 60° C. for 1 hour, from the viewpoints of the amount of water permeated and the salt rejection.

INDUSTRIAL APPLICABILITY

As described above, in the polyamide TFC reverse osmosis membrane according to the present invention, polyfunctional tertiary alcohol amine is used as a post-treatment compound and a high-temperature drying step is further performed after performing the post-treatment, thereby attaining the polyamide TFC reverse osmosis membrane having improved water permeability and salt rejection compared to the prior art using various post treatment agents or methods.

The invention claimed is:

1. A preparation method of a polyamide thin film composite (TFC) reverse osmosis membrane using interfacial polymerization of an amine aqueous solution and amine-reactive compound, the preparation method comprising the steps of:
   (a) forming a polyamide active layer through interfacial polymerization by contacting a surface of a porous support with the amine aqueous solution containing a polyfunctional aromatic amine monomer and an organic solution containing polyfunctional acyl halide monomer as an amine-reactive compound; and
   (b) performing post-treatment preceded by formation of the polyamide active layer by contacting the polyamide active layer with an aqueous solution containing 0.1 to 100 wt % of polyfunctional tertiary alcohol amine comprising at least two tertiary amines having substituted alcohol group on the hydrocarbon side chains.

2. The preparation method of claim 1, wherein the polyfunctional aromatic amine monomer is selected from the group consisting of 1,4-phenylenediamine, 1,3-phenylenediamine, 2,5-diaminotoluene, diphenyldiamine, and 4-methoxy-m-phenylenediamine.

3. The preparation method of claim 1, wherein the polyfunctional acyl halide monomer as the amine-reactive compound is selected from the group consisting of trimesoyl chloride (TMC), terephthaloyl chloride (TPC) and isophthalolyl chloride (IPC).

4. The preparation method of claim 1, wherein the polyfunctional tertiary alcohol amine is represented by the Formula 1 or 2:

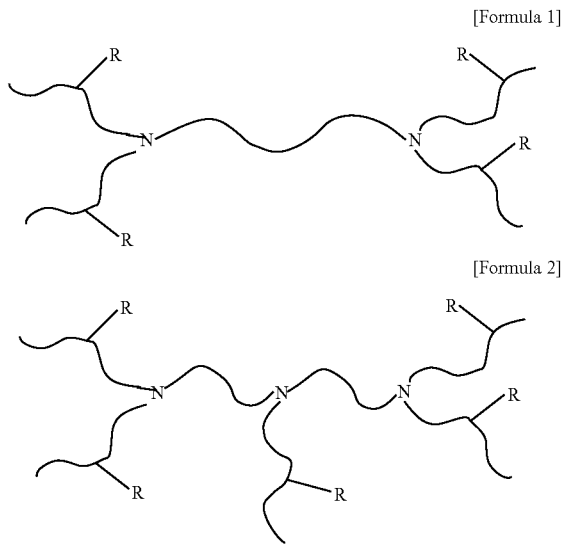

[Formula 1]

[Formula 2]

wherein R represents an alcohol group.

5. The preparation method of claim 1, wherein the polyfunctional tertiary alcohol amine is selected from the group consisting of N,N,N'N'-tetrakis(2-hydroxylpropyl)ethylenediamine, N,N,N'N'-tetrakis(2-hydroxylethyl)ethylenediamine, N,N,N'N'',N'''-pentakis(2-hydroxypropyl)diethylenetriamine and 2,2',2'',2'''-ethylenedinitrilotetraethanol.

6. The preparation method of claim 1, wherein the content of the polyfunctional tertiary alcohol amine in the aqueous solution in the step of performing post-treatment is 0.1 to 100 wt%.

7. The preparation method of claim 1, further comprising drying the polyamide TFC reverse osmosis membrane after performing the post-treatment.

8. The preparation method of claim 7, wherein the drying include a temperature in the range of from about room temperature to about 150° C. and a period of time in the range of from about 10 seconds to 1 hour.

9. A polyamide thin film composite (TFC) reverse osmosis membrane prepared by the method of claim 1.

* * * * *

UNITED STATES PATENT AND TRADEMARK OFFICE
CERTIFICATE OF CORRECTION

PATENT NO. : 7,598,296 B2
APPLICATION NO. : 10/586520
DATED : October 6, 2009
INVENTOR(S) : Yoo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 557 days.

Signed and Sealed this

Twenty-eighth Day of September, 2010

David J. Kappos
*Director of the United States Patent and Trademark Office*